US005534928A

United States Patent [19]

Iwamura

[11] Patent Number: 5,534,928
[45] Date of Patent: Jul. 9, 1996

[54] APPARATUS AND METHOD FOR DECODING A PLURALITY OF ENCODED VIDEO SIGNALS

[75] Inventor: Ryuichi Iwamura, Tokyo, Japan

[73] Assignee: Sony Corporation, Tokyo, Japan

[21] Appl. No.: 119,483

[22] Filed: Sep. 13, 1993

[30] Foreign Application Priority Data

Sep. 14, 1992 [JP] Japan .................................. 4-272364

[51] Int. Cl.$^6$ ................................ H04N 7/34; H04N 7/68
[52] U.S. Cl. .......................... 348/401; 348/409; 348/416; 348/420; 348/466; 348/415; 348/699; 348/700
[58] Field of Search ...................... 348/415, 416, 348/417, 409, 412, 401, 411, 420, 699, 700; 375/122, 33, 31, 30

[56] References Cited

U.S. PATENT DOCUMENTS

| 5,122,876 | 6/1992  | Aoki ............................. 348/416 |
| 5,140,437 | 8/1992  | Yonemitsu et al. ............ 348/417 |
| 5,146,325 | 9/1992  | Ng ................................. 348/415 |
| 5,150,210 | 9/1992  | Hoshi et al. ................... 348/415 |
| 5,168,356 | 12/1992 | Acampora et al. ............ 348/415 |
| 5,185,819 | 2/1993  | Ng et al. ........................ 348/416 |
| 5,212,549 | 5/1993  | Ng et al. ........................ 348/412 |
| 5,243,420 | 9/1993  | Hibi .............................. 348/412 |
| 5,247,363 | 9/1993  | Sun et al. ...................... 348/416 |
| 5,410,553 | 4/1995  | Choon ........................... 348/416 |

FOREIGN PATENT DOCUMENTS

| 0353757 | 2/1990  | European Pat. Off. . |
| 0514188 | 11/1992 | European Pat. Off. . |
| 0551599 | 7/1993  | European Pat. Off. . |

Primary Examiner—Tommy P. Chin
Assistant Examiner—Anand Rao
Attorney, Agent, or Firm—William S. Frommer; Alvin Sinderbrand

[57] ABSTRACT

An apparatus for decoding a plurality of video signals each encoded by one of intra-coding (I), predictive-coding (P) and bidirectionally-predictive coding (B). Errors in the encoded video signals are detected and determined to be either correctable or uncorrectable. The errors determined to be correctable are corrected, whereupon the encoded video signal or signals containing the corrected error or errors are decoded. The encoded video signal or signals having one or more errors determined to be uncorrectable are replaced by one of the previously decoded video signals.

26 Claims, 10 Drawing Sheets

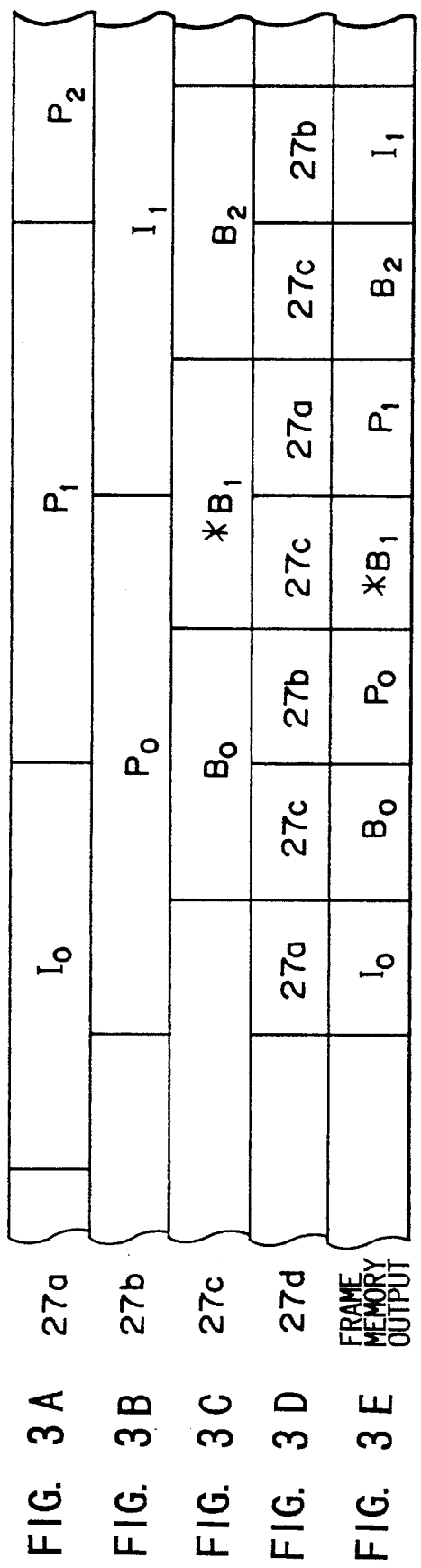

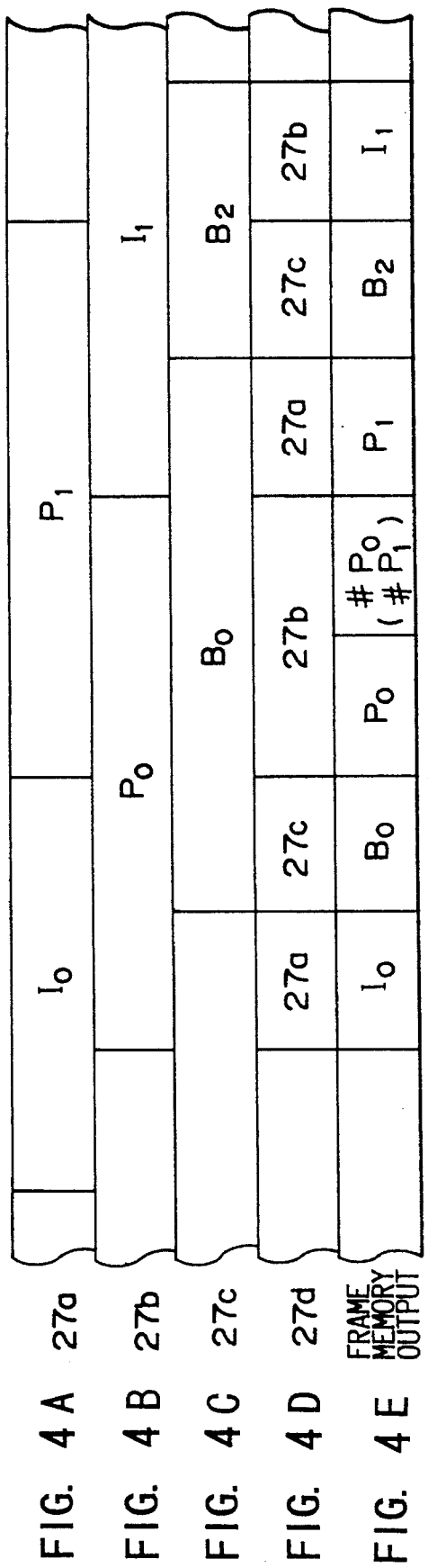

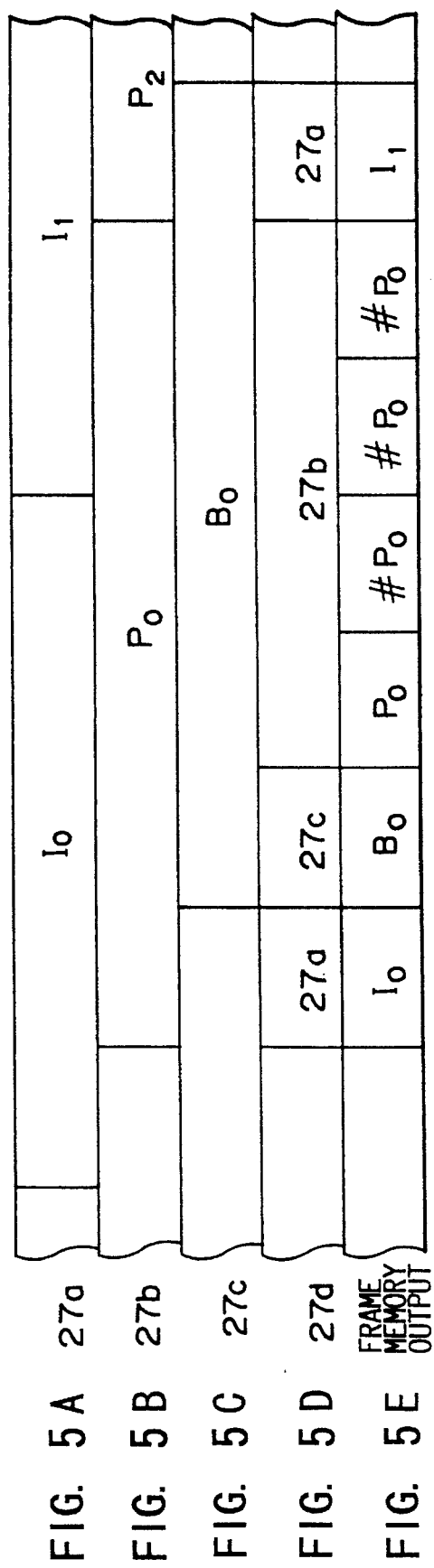

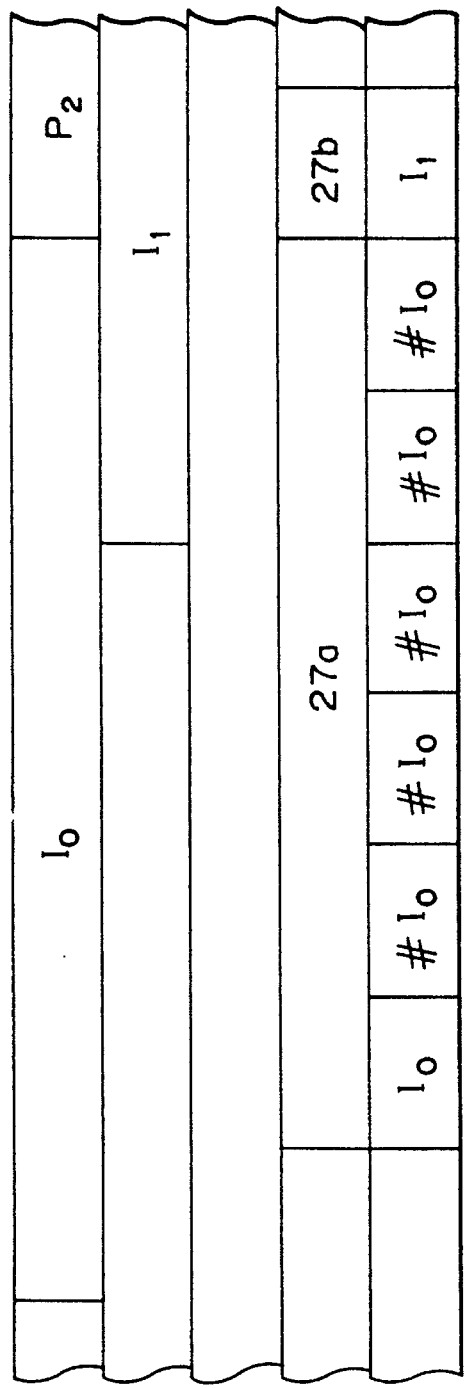

| | | | | | | | | | | |
|---|---|---|---|---|---|---|---|---|---|---|
| FIG. 7A 27a | I₀ | | | P₁ | | | @P₂ | | | I₂ |
| FIG. 7B 27b | | P₀ | | | | *I₁ | | | @P₃ | |
| FIG. 7C 27c | | B₀ | | B₁ | | @B₂ | @B₃ | @B₄ | @B₅ | |
| FIG. 7D 27d | 27a | 27c | 27b | 27c | 27a | 27b | 27c | 27b | 27c | 27a |
| FIG. 7E FRAME MEMORY OUTPUT | I₀ | B₀ | P₀ | B₁ | P₁ | @B₂ *I₁ | @B₃ @P₂ | @B₄ @P₃ | @B₅ | I₂ |

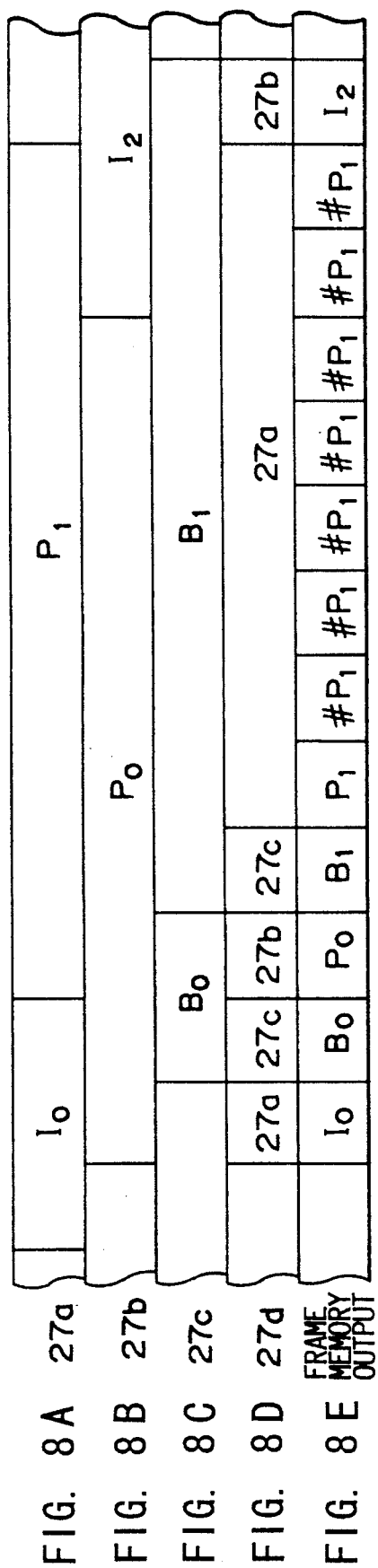

APPARATUS AND METHOD FOR DECODING A PLURALITY OF ENCODED VIDEO SIGNALS

BACKGROUND OF THE INVENTION

1. Field of the Invention

This invention relates to a decoding apparatus and, more particularly, to such apparatus for decoding video signals encoded by one of intra-coding, predictive-coding and bidirectionally-predictive coding.

2. Description of the Prior Art

Since the amount of digitized data representing motion pictures is relatively large, such data is typically compressed prior to recording on a recording medium or transmission so as to reduce the amount of data required to be transmitted or recorded, thereby reducing the amount of storage area required on the recording medium. Accordingly, during reception or reproduction, the compressed data is recovered or reproduced from the recording medium and thereafter processed so as to recover the original digitized data. Recording and reproducing as aforedescribed may be performed by a recording and reproducing apparatus, such as that illustrated in FIGS. 9 and 10, respectively.

Video data representing a video picture may be coded by either intra-coding (I-coding), which may include intra-frame coding, intra-field coding and intra-picture coding; predictive-coding (P-coding); or bidirectionally-predictive coding (B-coding) and successive frames usually are represented by all three coding techniques. Accordingly, a video picture formed from data which has been I-coded is hereinafter referred to as an I picture; a video picture formed from data which has been P-coded is referred to as a P picture, and that which has been B-coded is referred to as a B-picture.

An I picture is generated by using only data representing the corresponding frame of that picture. A P picture is generated by using data representing a temporally preceding and previously decoded frame of an I or P picture. In other words, a P picture is generated by using data representing a picture which serves as a reference for determining a difference therebetween, which may be used in deriving a motion vector, as hereinafter more fully described. A B picture is a predictive-type picture which may be generated from any of the following:

1) a temporally preceding and already decoded frame of an I or P picture;

2) a temporally succeeding and already decoded frame of an I or P picture; and 3) a combination of the pictures in groups 1 and 2.

During recording, as shown in FIG. 9, analog video signals from a video camera 1, representing a plurality of video pictures, are supplied to an analog-to-digital (A/D) converter 2, whereupon the analog video signals are converted to digital video signals. The digital video signals from the converter 2 are stored in a frame memory 3, and subsequently are read out therefrom in accordance with a predetermined timing rate and supplied to an input of a subtracting circuit 4. An output signal from the subtracting circuit 4 is supplied to a discrete cosine transform (DCT) circuit 5 which processes the received signal in accordance with a discrete cosine transform so as to obtain DCT coefficient data which are supplied therefrom to a quantizing circuit 6. The quantizing circuit 6 quantizes the received DCT coefficient data and supplies the same to a variable-length coding (VLC) circuit 7, wherein the quantized data is coded into a variable-length code, for example, the Huffman code, and thereafter stored in a video code buffer 8.

The quantized DCT coefficient data from the quantizing circuit 6 is further supplied to an inverse quantizing circuit 10, whereupon inverse quantization processing is performed on data representing video pictures which had been intraframe coded or simply intra-coded (that is, an I picture), or predictive-coded (that is, a P picture). The inverse-quantized DCT coefficient data is supplied to an inverse DCT circuit 11, which performs an inverse discrete cosine transformation on the received data, and supplies an output therefrom to one input of an adding circuit 12. Output picture data from the adding circuit 12 is stored in a frame memory 13.

A motion detecting circuit 14 is coupled to the frame memory 3 and is adapted to detect frame-to-frame motion in the video picture represented by the data stored in the frame memory and to generate a motion vector corresponding to such detected motion. The motion vector is supplied to the VLC circuit 7 for transmission or recording after being encoded, and to a motion compensating circuit 15. The motion compensating circuit 15 further receives the stored picture data from the frame memory 13 and performs motion compensation thereon in accordance with the received motion vector. The motion compensated picture data is supplied to the subtracting circuit 4 so as to be subtracted from the video signal data supplied from the frame memory 3, thereby producing a difference between the frame of picture data that is received and a prediction or estimate of that frame.

The motion compensated picture data from the motion compensating circuit 15 is further supplied to a second input of the adding circuit 12. The adding circuit 12 adds such data to the output data supplied from the inverse DCT circuit 11 so as to generate decoded data representing a decoded I, P or B picture, which is supplied to the frame memory 13 so as to be stored therein as previously described and functions as a prediction of the next-following picture frame.

Thus, the picture data stored in the frame memory 13 is obtained from decoding the same data which is supplied by the quantizing circuit 6 through the VLC circuit 7 to the video code buffer 8. As a result, picture data representing either a P or B picture can be obtained by utilizing the picture data stored in the frame memory 13. An I picture, on the other hand, is generated when only picture data from the frame memory 3 is supplied to the DCT circuit 5. In this situation, motion compensated picture data from the motion compensating circuit 15 is not supplied to the subtracting circuit 4 so that only the present frame of picture data from the frame memory 3 is received by the subtracting circuit which supplies such data therethrough to the DCT circuit 5.

A rate controller 9 monitors the amount of data stored in the video code buffer 8 and, in response thereto, is adapted to supply a signal to the quantizing circuit 6 which adjusts the size of the quantization step utilized by the quantizing circuit. As a result, the bit rate at which data is supplied to the video code buffer 8 for storage thereat varies, thereby preventing an overflow or an underflow of data thereto.

The rate controller 9 further supplies the signal having the quantization step size to the VLC circuit 7. The quantization step size signal along with the motion vector supplied from the motion detecting circuit 14 are processed by the VLC circuit in a manner similar to that previously described and supplied therefrom to the video code buffer 8.

Output data signals from the video code buffer 8 are supplied to a parity adding circuit 30, which is adapted to add error correction parity bits to the received data signals. Such error correction parity bits are utilized for error correction in a manner well known in the art. An output data signal from the parity adding circuit 30 is modulated in accordance with a predetermined type of modulation by a modulating circuit 31. A modulated data signal is supplied from the modulating circuit 31 to a pick up device 32, whereupon the modulated data signal is written onto a recording medium, such as an optical disc 16 or, alternatively, transmitted.

Thus, in the recording apparatus of FIG. 9, video signals from the video camera 1 are compressed by reducing the redundancy between frames of picture data and by utilizing DCT processing and motion vectors, in a relatively highly efficient manner so as to obtain a relatively high compression rate, and then recorded onto the medium 16, as previously described. Accordingly, since video picture data is encoded with such relatively high efficiency, the amount of storage area required on the medium 16 is minimized.

During reproducing (or reception), as shown in FIG. 10, data is read from the medium 16 by a pick-up device 40, or otherwise received, and thereafter demodulated by a demodulating circuit 41. The demodulated data is then error corrected in an error correcting circuit 42 by utilizing the error correction parity bits added in the parity adding circuit 30. The error corrected demodulated data is supplied to a video code buffer 21 for storage thereat.

The data stored in the video code buffer 21 is read out therefrom and supplied to an inverse VLC circuit 22, which performs inverse VLC processing corresponding to the processing performed by the VLC circuit 7 (FIG. 9). Upon completing the inverse VLC processing, the inverse VLC circuit 22 supplies the processed data to an inverse quantizing circuit 23 and further supplies a code request signal to the video code buffer 21 requesting that additional data be read out and supplied to the inverse VLC circuit. The inverse VLC circuit 22 still further supplies a signal representing the quantization step size to the inverse quantizing circuit 23 and a motion vector to a motion compensating circuit 26. The quantization step size and the motion vector supplied from the inverse VLC circuit 22 correspond to those which are respectively produced by the rate controller 9 and the motion detecting circuit 14. Such quantization step size and motion vector had been recorded on the medium 16, as previously described, and subsequently reproduced therefrom along with the picture data.

The inverse quantizing circuit 23 performs inverse quantization processing on the received data in accordance with the quantization step size supplied from the inverse VLC circuit 22. Such inverse quantization corresponds to the quantization processing performed by the quantizing circuit 6 (FIG. 9).

Output data from the inverse quantizing circuit 23 is supplied to an inverse DCT circuit 24 which performs inverse DCT processing corresponding to the processing performed in the DCT circuit 5 (FIG. 9). If the data which has been inverted DCT processed represents an I picture, such data is supplied to a frame memory 27 by way of an adding circuit 25.

If the data which has been inverse DCT processed represents a P picture that had been obtained by utilizing data representing an I picture, data representing the I picture is read out from the frame memory 27 and supplied to the motion compensating circuit 26 so as to be motion compensated in accordance with the motion vector supplied thereto from the inverse VLC circuit 22. Such motion compensated data is supplied to the adding circuit 25 and added thereat to the data from the inverse DCT circuit 24 so to form the data representing the P picture, which then is stored in the frame memory 27.

If the data which has been inverse DCT processed represents a B picture, data representing either an I or a P picture is read out from the frame memory 27 and supplied to the motion compensating circuit 26 so as to be motion compensated in a manner similar to that previously described. Such motion compensated data is supplied to the adding circuit 25 and added thereat to the data from the inverse DCT circuit 24 so as to form the data representing the B picture, which is stored in the frame memory 27.

The data stored in the frame memory 27 is read out therefrom at a predetermined timing rate and supplied to a digital-to-analog (D/A) converting circuit 28, whereupon the data is converted into analog signals. The analog signals are supplied to a display 29 and displayed thereon.

Thus, the data, which had been encoded with relatively high efficiency and recorded onto the record medium 16, is reproduced and decoded so as to enable the same to be displayed on the display 29.

The motion compensation performed on the video data by the recording and reproducing apparatus illustrated in FIGS. 9 and 10, respectively, is more fully explained with reference to FIG. 2. That is, FIG. 2 illustrates a sequence of I, P and B video pictures. The arrows in FIG. 2 indicate the video picture or pictures which are used in forming a respective video picture or frame. For example, the arrow from an Io picture to a Po picture indicates that the Po picture is formed by utilizing a motion vector derived by using the Io picture as a reference video picture. As a further example, the two arrows directed towards a Bo picture indicate that the Bo picture is formed by utilizing a motion vector derived by using either the Io or Po pictures, or both the Io and Po pictures, as a reference video picture(s).

The sequence of video pictures illustrated in FIG. 2, that is, Io, Bo, Po, B1, P1, B2, I1, B3, P2 and so forth, represents the sequence of the video pictures before they are encoded in the recording apparatus of FIG. 9. During encoding this sequence is changed. This changed sequence, which is Io, Po, Bo, P1, B1, I1, B2, P2, B3 and so forth, is the sequence in which the video pictures are recorded on the record medium 16, reproduced therefrom, and supplied to the decoding portion of the reproducing apparatus of FIG. 10. The changed sequence is rearranged by use of the frame memory 27 (FIG. 10) to the sequence illustrated in FIG. 2. Accordingly, the sequence of video pictures supplied to the display 29 from the frame memory 27 has the sequence illustrated in FIG. 2. As is to be appreciated, this change in the sequence is performed so that pictures used as reference pictures in deriving motion vectors are decoded prior to the pictures formed by utilizing such motion vectors.

Suppose that in reading data from the medium 16, an error occurs or is detected by the error correcting circuit 42 which is outside the error correction capability of the error correcting circuit, thereby making the error uncorrectable. Such an uncorrectable error or errors may affect one or more video pictures. That is, an uncorrectable error occurring in data of a B picture only affects the respective B picture, which nevertheless may result in distortion of the displayed data. However, an uncorrectable error occurring in data of either a P or an I picture not only affects the respective P or I picture, but also the pictures which are formed by using motion vectors derived by using the affected respective P or I picture as a reference picture. Thus, in this latter situation, not only will the P or I picture having the uncorrectable error be distorted during the display thereof, but so will the pictures formed by using such I or P picture. For example, if an uncorrectable error occurs in the P1 picture of FIG. 2, this error will affect the P1, B1 and B2 pictures. As another example, if an uncorrectable error occurs in the I1 picture of FIG. 2, the error will affect the B2, B3, P2, B4, P3 and B5, as well as the I1, pictures.

If an uncorrectable error occurs in a digital video tape recorder and reproducer (VTR), which may be used as the recording and reproducing apparatus shown in FIGS. 9 and 10, the portion of an I picture containing the error may be corrected by interpolating the data from an adjacent picture or pictures. However, if the digital VTR is operating in an inter-picture or inter-frame motion prediction mode (that is, a mode wherein the picture being processed, for example, a P or B picture, is formed by using data from at least one other picture), such error correcting technique will normally produce unsatisfactory results (such as unsightly distortions) unless a correct reference picture is obtained and used to reproduce the P or B picture.

Thus, the prior art has failed to provide a decoding apparatus which minimizes picture distortion even if an uncorrectable error exists in picture data that was encoded by using an inter-picture or inter-frame motion prediction technique.

OBJECTS AND SUMMARY OF THE INVENTION

An object of the present invention is to provide a technique for decoding motion picture data which overcomes the problems associated with the prior art.

More specifically, it is an object of the present invention to provide a technique for decoding motion picture data which substitutes other previously decoded motion picture data for motion picture data having an uncorrectable error.

Another object of the present invention to is provide a technique for decoding motion picture data as aforesaid in which correctable errors are corrected.

Yet another object of the present invention is to provide a technique for decoding motion picture data as aforesaid in which the motion picture data includes data representing at least i) an intra-frame encoded picture I, ii) a forward predictive encoded picture P, or iii) a bidirectionally-predictive encoded picture B.

A still further object of the present invention is to provide a technique for decoding motion picture data as aforesaid in which data representing a previous forward predictive encoded picture P is substituted for present data representing a bidirectionally-predictive encoded picture B if the data representing the B picture includes an uncorrectable error.

Another object of the present invention is to provide a technique for decoding motion picture data as aforesaid in which, if the data representing a current forward predictive encoded picture P includes an uncorrectable error, data representing the preceding forward predictive encoded picture is substituted therefor and also for an adjacent bidirectionally-predictive encoded picture B.

Yet another object of the present invention is to provide a technique for decoding motion picture data as aforesaid in which, if the data representing a forward predictive encoded picture P includes an uncorrectable error, data representing a preceding intra-frame encoded picture I is substituted for data representing all forward predictive encoded pictures P and bidirectionally-predictive encoded pictures occurring between the preceding intra-frame encoded picture I and a subsequent intra-frame encoded picture.

Another object of the present invention is to provide a technique for decoding motion picture data as aforesaid in which, if the data representing a current intra-frame encoded picture I includes an uncorrectable error, data representing the preceding forward predictive encoded picture P is substituted for data representing: i) all forward predictive encoded pictures P occurring between the current intra-frame encoded picture I and the next-following intra-frame encoded picture I, ii) a subsequent bidirectionally-predictive encoded picture B, and iii) the preceding bidirectionally-predictive encoded picture B.

Still another object of the present invention is to provide a technique for decoding motion picture data as aforesaid in which the motion picture data is reproduced from a recording medium.

In accordance with an aspect of the present invention, a technique is provided for decoding a plurality of encoded video signals, in which each of the video signals is encoded by intra-coding (I), predictive-coding (P) or bidirectionally-predictive coding (B) and each respectively represents one of an I, P and B coded video picture. The plurality of encoded video signals have a coding sequence representing a corresponding sequence of coded video pictures. The decoding technique detects errors in the encoded video signals and determines whether the detected errors are correctable or non-correctable, corrects the detected errors determined to be correctable so as to form corrected encoded video signals, decodes the corrected encoded video signals, and substitutes one of the decoded corrected video signals for an encoded video signal which has a detected error determined to be non-correctable.

Other objects, features and advantages according to the present invention will become apparent from the following detailed description of the illustrated embodiment when read in conjunction with the accompanying drawings in which corresponding components are identified by the same reference numerals.

BRIEF DESCRIPTION OF DRAWINGS

FIGS. 3A–3E are schematic diagrams to which reference will be made in explaining a frame memory switching control operation performed when an uncorrectable error occurs in a B1 picture;

FIGS. 4A–4E are schematic diagrams to which reference will be made in further explaining the frame memory switching control operation performed when an uncorrectable error occurs in a B1 picture;

FIGS. 5A–5E are schematic diagrams to which reference will be made in explaining a frame memory switching control operation performed when an uncorrectable error occurs in a P1 picture;

FIGS. 6A–6E are schematic diagrams to which reference will be made in explaining a frame memory switching control operation performed when an uncorrectable error occurs in a P0 picture;

FIGS. 7A–7E are schematic diagrams to which reference will be made in explaining a frame memory switching control operation performed when an uncorrectable error occurs in an I1 picture;

FIGS. 8A–8E are schematic diagrams to which reference will be made in further explaining the frame memory switching control operation performed when an uncorrectable error occurs in an I1 picture;

DETAILED DESCRIPTION OF THE PREFERRED EMBODIMENT

Figure 1:
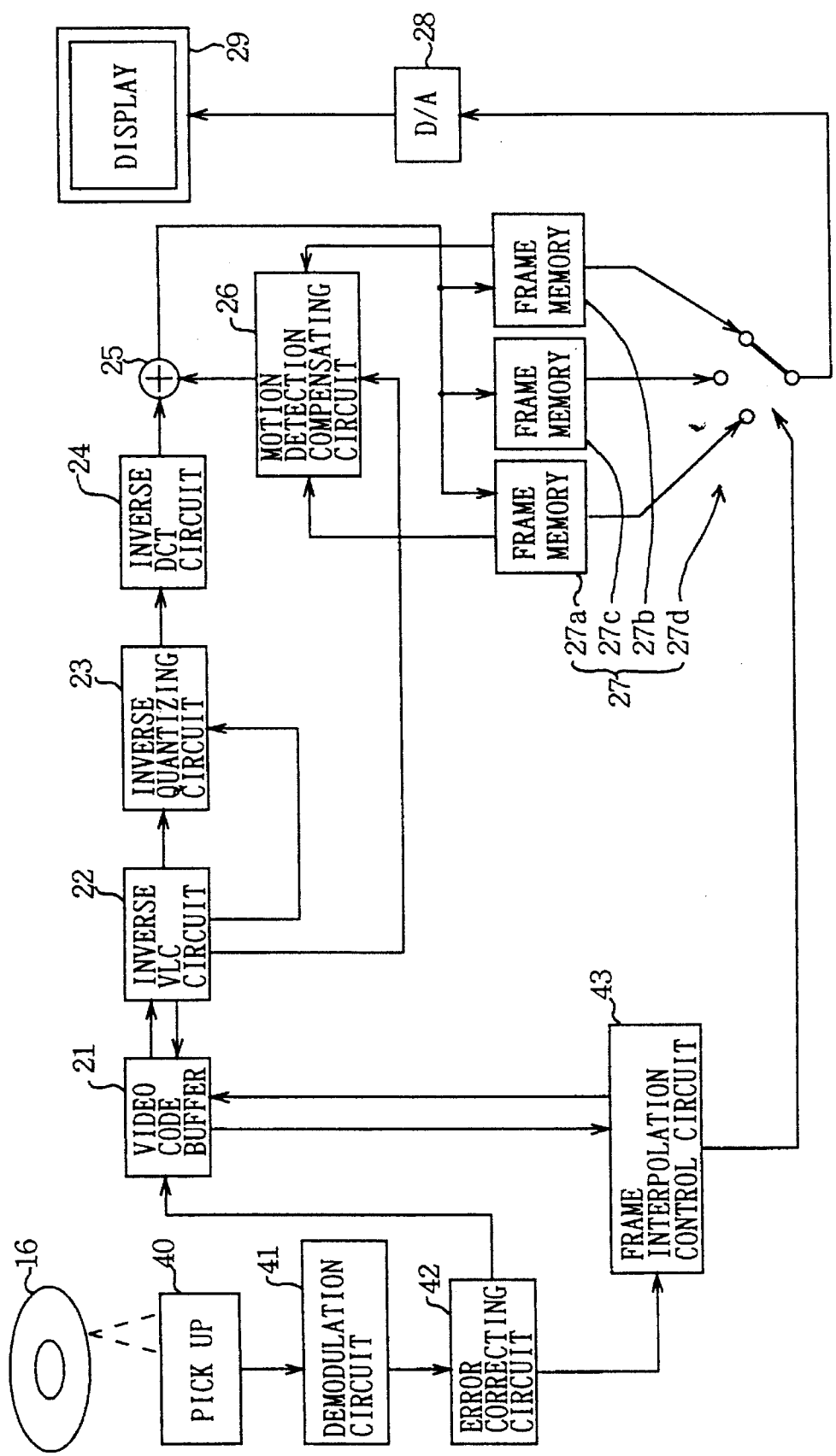
FIG. 1 is a block diagram of a motion picture reproducing apparatus in which an embodiment of the present invention finds ready application.

A motion picture reproducing apparatus incorporating an embodiment of the present invention is illustrated in FIG. 1. Several of the elements included in such apparatus are substantially similar to and function in a substantially similar manner as elements included in the apparatus of FIG. 10 and, accordingly have common reference numerals. Since these elements have been described above, only a brief discussion of such elements is provided herein and a further detailed description of such elements is omitted.

Figure 10:
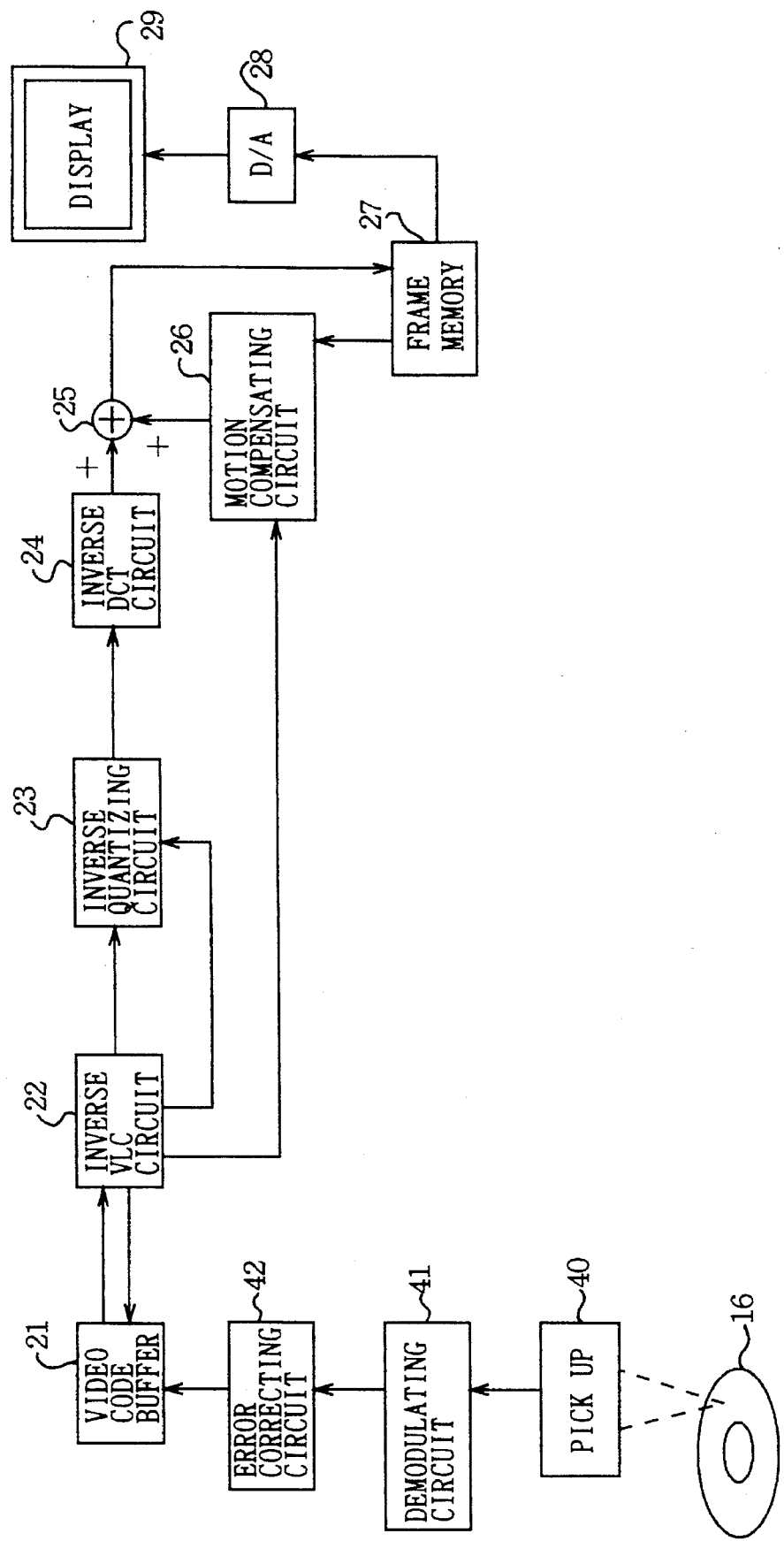
FIG. 10 is a block diagram illustrating a motion picture reproducing apparatus having a motion picture decoder according to the prior art.

As shown in FIG. 1, and in a manner similar to that previously described with reference to FIG. 10, data representing a plurality of video pictures is stored on a recording medium, such as the recording medium 16 which may be an optical disc. The stored data is read from the recording medium 16 by the pick-up device 40, for example, by irradiating a laser beam at the optical disc and then receiving the reflected light therefrom from which the data is reproduced. The reproduced data is demodulated in the demodulating circuit 41 and a demodulated signal is supplied therefrom to the error correcting circuit 42. The error correcting circuit 42 detects errors in the received demodulated signal, corrects the errors determined to be correctable, and supplies the corrected data to the video code buffer 21. With the exception of a frame interpolation control circuit 43, frame memories 27a, 27b and 27c, and a frame memory switch 27d, as discussed hereinafter, the arrangement of elements from the video code buffer 21 to the display 29 and the processing performed therein is similar to that discussed with reference to FIG. 10 and, as such, will not be further discussed herein.

The improvement of the reproducing apparatus of FIG. 1 over that of FIG. 10 will now be described.

In the reproducing apparatus of FIG. 1, the error correcting circuit 42 is adapted to receive the demodulated signal from the demodulation circuit 41 and to detect errors therein, determine if such detected errors are correctable or uncorrectable, correct the correctable errors, and generate and supply therefrom a signal indicating the presence of uncorrectable errors as hereinafter more fully described. The frame interpolation control circuit 43 is coupled to the error correcting circuit 42, the video code buffer 21 and the frame memory switch 27d, and, upon receiving the signal indicating the presence of uncorrectable errors, is adapted to provide control signals to the video code buffer and the frame memory switch. The frame memory switch 27d is adapted to changeover in response to the control signal received from the frame interpolation control circuit 43 so as to couple one of the frame memories 27a, 27b and 27c to the D/A converter 28. The frame memories 27a–c are adapted to respectively receive data from the adding circuit 25 representing I, P and B pictures and to store such data therein. Frame memories 27a and 27b, which respectively contain data representing I and P pictures, are coupled to the motion detection compensating circuit 26 so as to provide such stored data to the circuit 26. Such stored I and P picture data is motion compensated by the motion detection compensating circuit 26 in a manner similar to that previously described with reference to FIG. 10. In the preferred embodiment, each of the frame memories is capable of storing only one video picture. Accordingly, only the latest video picture supplied to the frame memory is saved therein. However, the present invention is not so limited and instead, frame memories may be utilized which can accommodate more or less than one video picture.

During operation of the reproducing apparatus of FIG. 1, the error correcting circuit 42 detects errors in the demodulated signal supplied thereto and determines whether such errors are correctable or uncorrectable. If the errors are correctable, such errors are corrected by the error correcting circuit 42 and the corrected data is supplied to the video code buffer 21. If, however, the errors are determined to be uncorrectable, the error correcting circuit 42 generates an uncorrectable signal and supplies the same to the frame interpolation control circuit 43. Upon receiving such uncorrectable signal, the frame interpolation control circuit 43 generates a control signal which is forwarded to the video code buffer 21. In response to the received control signal, the video code buffer 21 inhibits the supply therefrom to the inverse VLC circuit 22 of data which includes an uncorrectable error and further inhibits the use of such data as a reference in deriving a motion vector in a manner similar to that previously described. In other words, the video code buffer, in response to the control signal, inhibits from being supplied to the inverse VLC circuit 22: i) data representing a video picture which is determined to have an uncorrectable error, and ii) data representing a video picture or pictures which are formed by using the data having an uncorrectable error to derive a motion vector(s) therefrom, thereby inhibiting the further processing of this data. As a result, this data is not decoded, is not stored in one of frame memories 27a, 27b and 27c, and is not displayed on the display 29. Instead, in this situation, data which has been already decoded and stored in one of the frame memories is substituted for the data which was inhibited by the video code buffer 21.

Additionally, in response to the uncorrectable signal, the frame interpolation control circuit 43 generates a switch control signal and supplies the same to the frame memory switch 27d. Upon receiving the switch control signal, the frame memory switch 27d is adapted to change over the switch 27d so as to connect a designated one of the frame memories 27a–27c to the D/A converter 28. As a result, the data stored in the designated frame memory is supplied through the D/A converter 28 to the display 29.

Thus, in the reproducing apparatus of FIG. 1, when data is detected as containing an uncorrectable error, such data, and any data that otherwise would be formed from such data, is not decoded and displayed. Instead, data, which was previously decoded and stored in one of the frame memories and which does not contain any uncorrectable errors or was not obtained from data containing such uncorrectable errors, is substituted for the data which was not decoded and displayed.

Figure 2:
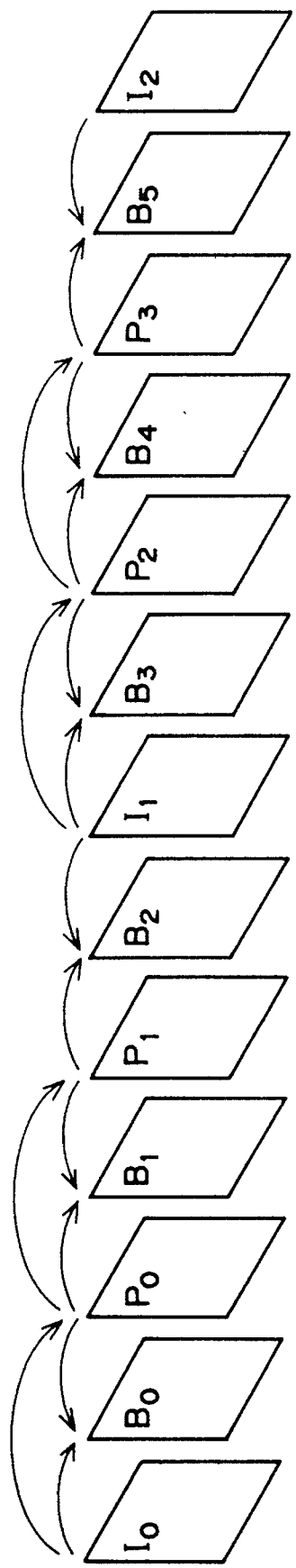
FIG. 2 is a schematic diagram illustrating a sequence of video pictures which is useful in understanding the present invention.
Figure 9:
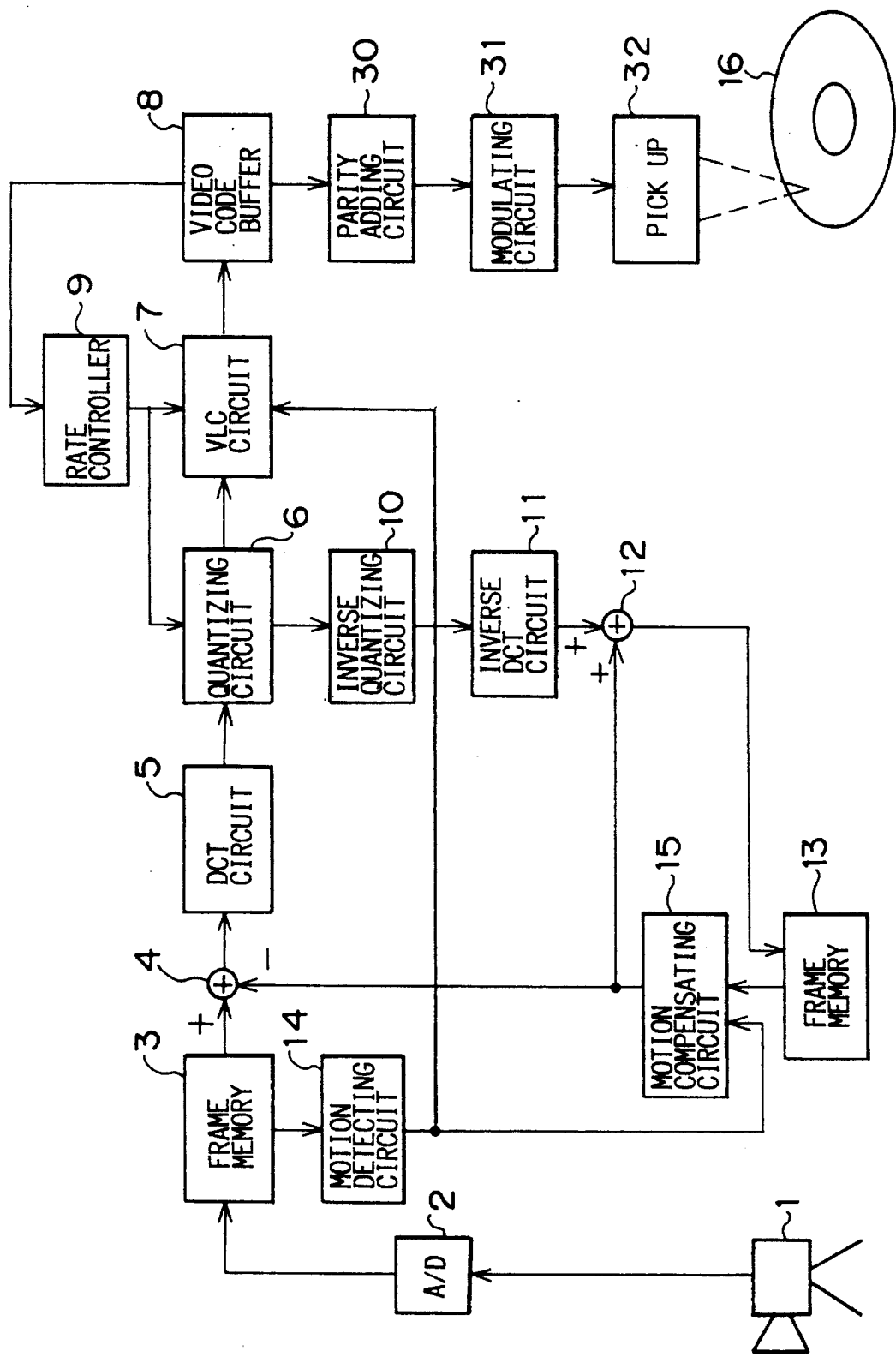
FIG. 9 is a block diagram illustrating a motion picture recording apparatus having a motion picture encoder according to the prior art.

Examples of switching operations performed by the frame memory switch 27d when an uncorrectable error is detected will now be described with reference to FIGS. 3–8. These examples will be described by referring for convenience to the video pictures and not the data which forms such pictures, although it is to be understood that reference to a video picture is intended to, and should be construed as, reference to the data which comprises such picture. Further, in describing these examples, the sequence of video pictures illustrated in FIG. 2 is used. However, the present invention is not so limited and may be applied to any sequence of video pictures. Additionally, the sequence of video pictures may be arranged in a predetermined coding sequence, such as that of FIG. 2, or may instead be arranged in a varying coding sequence. In this latter situation, a coding identification detecting device (not shown) may be utilized to read coding information from each header portion of the video pictures and to determine therefrom the type of coding associated therewith. Such coding information, which is recorded in the header portion associated with each video picture during the recording operation of the video data, identifies the type of coding performed on the video data for the respective video picture.

In FIGS. 3–8, the symbol "*" denotes an uncorrectable error, and accordingly undecodable, picture, that is, a picture formed from data having an uncorrectable error; the symbol "@" denotes a picture which is undecodable because it would be formed by using an uncorrectable error picture as a reference picture; and the symbol "#" denotes a picture which was substituted for an undecodable picture. These examples will be described by referring for convenience to the video pictures and not the data which forms such pictures, although it is to be understood that reference to a video picture is intended to, and should be construed as, reference to the data which comprises such picture.

As previously described, the sequence of pictures illustrated in FIG. 2 is the picture sequence prior to encoding and is the sequence supplied to the display 29. However, during encoding this sequence is changed such that the actual sequence recorded on the medium and subsequently decoded is I0, P0, B0, P1, B1, I1, B2, P2, B3, and so forth.

In a normal reproduction mode, the I0 picture is first decoded and stored in the frame memory 27a, the P0 picture is next decoded and stored in the frame memory 27b, and then the B0 picture is decoded in conjunction with the I0 and P0 pictures and stored in the frame memory 27c. Thereafter, the P1 picture is decoded and stored in the frame memory 27a, then the B1 picture is decoded by reference to the P0 and P1 pictures and stored in the frame memory 27c, next the I1 picture is decoded and stored in the frame memory 27b, and then the B1 picture is decoded by using the P1 and I1 pictures and stored in the frame memory 27c. The decoding performed during the normal reproduction mode continues in this manner.

As previously described, the sequence in which the video pictures are decoded is different from the sequence in which the video pictures are to be displayed. Therefore, the sequence of decoded pictures is rearranged prior to being displayed on the display 29. To accomplish such rearranging, a control signal may be provided to the switch 27d (FIG. 1) from a controller (not shown), whereupon the switch operates to couple the appropriate frame memory to the display so as to obtain the desired sequence of video pictures. Alternatively, such control signal may be provided from the frame interpolation control circuit 43 (FIG. 1). In the normal operation described above, the frame switch 27d is controlled so as to couple the frame memories to the display 29 in the order shown in FIG. 2.

Consider the situation in which an uncorrectable error occurs or is detected at the B1 picture. In this situation, if another picture is not substituted for *B1, the sequence in which the pictures would be decoded, stored in the frame memories and supplied therefrom is illustrated in FIGS. 3A–E. More specifically, FIGS. 3A, 3B and 3C respectively indicate the times in which the pictures are decoded. That is, as shown therein, the sequence in which the pictures are decoded is I0, P0, B0, P1, *B1 and so forth. FIG. 3D indicates the sequence in which the frame memories are coupled by way of the switch 27d to the display 29 and FIG. 3E indicates the sequence of video pictures supplied from the frame memories 27a–c. Thus, as shown in FIGS. 3C and 3E, if another picture is not substituted for the *B1 picture, such *B1 picture is displayed, thereby resulting in a video picture sequence having an undesirable defect.

However, in accordance with the present invention, if an uncorrectable error occurs at the B1 picture, the frame interpolation control circuit 43 of the reproducing apparatus of FIG. 1 supplies a switch control signal to the switch 27d which causes the switch to couple the frame memory 27b (or 27a), as shown in FIG. 4D, instead of frame memory 27c, to the display 29. As a result, the video picture P0 (or P1) is supplied to the display instead of the *B1 picture. This results in the following sequence being provided to the display 29: I0, B0, P0, #P0 (or #P1), P1, B2, I1, B3, P2 and so forth, as shown in FIG. 4E. Such sequence provides an acceptable motion picture sequence. FIGS. 4A–C indicate the decoding and storing sequence of the pictures in a manner similar to that previously described with reference to FIGS. 3A–C.

Next, consider the situation in which an uncorrectable error is detected in the P1 picture. Without substituting any pictures, the sequence of pictures supplied to the display 29 would be as follows: I0, B0, P0, @B1, *P1, @B2, I1, B3, P2 and so forth. Thus, in this situation, three pictures, that is, @B1, *P1 and @B2, are uncorrectable and, if such three pictures were supplied to the display 29, a very undesirable video picture sequence would result. However, in this situation, a switch control signal is supplied to the switch 27d FIG. 1 which causes the switch to operate as illustrated in FIG. 5D, and this causes the P0 picture to be substituted for each of the @B1, *P1 and @B2 pictures. As a result, the sequence of pictures obtained from the frame memories 27a–c and supplied to the display 29, as illustrated in FIG. 5E, is as follows: I0, B0, P0, #P0, #P0, #P0, I1, B3, P2 and so forth. Further, as with FIGS. 3A–3C and 4A–4C, FIGS. 5A–5C indicate the decoding and storing sequence of the pictures.

Next, consider the situation in which an uncorrectable error is detected in the P0 picture. Without substituting any pictures, the picture sequence supplied to the display 29 would be as follows: I0, @B0, *P0, @B1, @P1, @B2, I1, B3, P2 and so forth. Accordingly, such sequence includes five pictures which cannot be decoded properly and, if supplied to the display 29, would result in a very undesirable video picture sequence. In this situation, a switch control signal is supplied to the switch 27d (FIG. 1) which causes the switch to operate as shown in FIG. 6D. As a result of such switch operation, the I0 picture is substituted for each of the pictures contained between the I0 and I1 pictures, so as to result in the following sequence of pictures being supplied from the frame memories: I0, #I0, #I0, #I0, #I0, #I0, I1, B3, P2 and so forth, as illustrated in FIG. 6E. As with FIGS. 3A–3C, 4A–4C and 5A–5C, FIGS. 6A–6C indicate the decoding and storing sequence of the pictures.

Next, consider the situation in which an uncorrectable error is detected in the I1 picture. In this situation, the I1 picture and all of the pictures between the I1 and I2 pictures, are undecodable. Accordingly, if no substitutions of pictures is made, the switch 27d would operate as shown in FIG. 7D and the sequence of pictures supplied to the display 29 would be as follows: I0, B0, P0, B1, P1, @B2, *I1, @B3, @P2, @B4, @P3, @B5, I2 and so forth, as illustrated in FIG. 7E. In this situation, a switch control signal is supplied to the switch 27d, whereupon the switch operates as illustrated in FIG. 8D. As a result, the sequence of pictures obtained from the frame memories, as illustrated in FIG. 8E, are as follows: I0, B0, P0, B1, P1, #P1, #P1, #P1, #P1, #P1, #P1, #P1, I2 and so forth. Further, FIGS. 7A–7C and 8A–8C indicate the decoding and storing sequence of the pictures when no substitution are made and when the previously described substitutes are made, respectively.

If an uncorrectable error is detected at I1 and I2, the P1 picture is substituted for each picture, in a manner similar to that described with reference to FIGS. 7A–7E and 8A–8E, until a decodable picture appears.

Therefore, the present invention, as described above, provides a decoding apparatus for decoding encoded video data representing a plurality of video pictures, which may be utilized in a reproducing device or a compressed video receiving device. In such present decoding apparatus, errors in each of the video pictures are detected and determined to be either correctable or uncorrectable, whereupon correctable errors are corrected and the picture containing such error(s) is decoded and pictures determined to contain an uncorrectable error (and, accordingly considered undecodable) are replaced with other temporally preceding decoded pictures. Such detection, correction and replacement or substitution of pictures may be accomplished by utilizing the error correcting circuit 42, three frame memories 27a–c, switch 27d and frame interpolation control circuit 43. Accordingly, the present decoding apparatus can be used to produce a sequence of pictures in which picture distortion is minimized even when an uncorrectable error is present in a picture signal.

Although in discussing the above examples, specific picture substitutions were made, the present invention is not limited to these precise substitutions and other picture substitutions may be made. For example, pictures may be replaced with a monochromatic picture, and, in the situation described with reference to the error depicted in FIG. 8, a #P0 picture may be used instead of the #P1 picture.

Further, although the present invention was described as being applied to a reproducing device for reproducing data stored on a record medium such as an optical disc, the present invention is not so limited. For example, other types of recording media, such as a magnetic disc, magnetic tape or the like, could also be used. Additionally, the present invention may be used to decode motion picture signals which are obtained by way of a communication transmission path. Additionally, the present invention may be applied to devices other than a reproducing device.

Furthermore, although a preferred embodiment of the present invention and modifications thereof have been described in detail herein, it is to be understood that this invention is not limited to this precise embodiment and modifications, and that other modifications and variations may be affected by one skilled in the art without departing from the spirit and scope of the invention as defined by the appended claims.

What is claimed is:

1. An apparatus for decoding a sequence of encoded video signals each video signal included in the sequence being encoded by intra-coding (I), predictive-coding (P) or bidirectionally-predictive coding (B) and each respectively representing one of an I, P and B coded video picture, with successive I coded signals being separated by plural B coded signals having at least one P coded signal interspersed between the B coded signals, and with B coded signals being encoded from P coded signals and selectively from I coded signals, and with P coded signals being selectively encoded from preceding I coded and P coded signals, said apparatus comprising:

means responsive to said encoded video signals to produce error-corrected encoded video signals;

decoding means for decoding said error-corrected encoded video signals and for using a decoded video signal as a reference for decoding error-corrected encoded video signals representing subsequent P and B coded video pictures;

means for detecting errors in said encoded video signals, for determining if the detected errors are non-correctable and for inhibiting the decoding of an encoded video signal having a non-correctable error; and substituting means for substituting for display one of the decoded error-corrected video signals for an encoded video signal having at least one detected error determined to be non-correctable, such that if a B coded signal is detected as having a non-correctable error, said B coded signal is replaced by a decoded error-corrected P coded signal for display, and if a P coded signal is detected as having a non-correctable error, said P coded signal and those P coded and B coded signals encoded therefrom are selectively replaced by a preceding decoded error-corrected P coded signal or by a preceding decoded error-corrected I coded signal for display, and if an I coded signal is detected as having a non-correctable error, said I coded signal and those P coded and B coded signals encoded therefrom, are replaced by a decoded error-corrected P coded signal for display.

2. An apparatus for decoding as in claim 1 wherein the decoding means is operable to decode a respective error-corrected encoded video signal representing a respective video picture by utilizing as said reference an adjacent encoded video signal representing a video picture adjacent to said respective video picture and wherein said substituting means is operable to substitute one of said decoded error-corrected video signals for an adjacent non-correctable encoded video signal.

3. An apparatus for decoding as in claim 1 wherein said substituting means is operable to substitute a previously decoded error-corrected video signal representing one of a previous I and P coded video picture for said non-correctable encoded video signal.

4. An apparatus for decoding as in claim 2 wherein said substituting means is operable to substitute a previously decoded error-corrected video signal representing one of a previous I and P coded video picture for an encoded video signal representing a B coded video picture located in said sequence of coded video pictures between the previous I or P coded video picture and a future I coded video picture when said non-correctable encoded video signal represents a P coded video picture located between said previous I or P coded video picture and said future I coded video picture.

5. An apparatus for decoding as in claim 2 wherein said substituting means is operable to substitute a previously decoded error-corrected video signal representing one of a previous I and P coded video picture for: (i) an encoded video signal representing a B coded video picture located in said sequence of coded video pictures between the previous I or P coded video picture and a current P coded video picture, and (ii) an encoded video signal representing one of a P and B coded video picture located in said sequence of coded video pictures between said current P coded video picture and a future I coded video picture when said non-correctable encoded video signal represents a current P coded video picture.

6. An apparatus for decoding as in claim 2 wherein said substituting means is operable to substitute a previously decoded error-corrected video signal representing one of a previous I and P coded video picture for: (i) an encoded video signal representing a B coded video picture located in said sequence of coded video pictures between said previous I or P coded video picture and a current I coded video picture, and (ii) an encoded video signal representing one of a P and B coded video picture located in said sequence of coded video pictures between said current I coded video picture and a future I coded video picture when said non-correctable encoded video signal represents a current I coded video picture.

7. A method for decoding a sequence of encoded video signals each video signal included in the sequence being encoded by intra-coding (I), predictive-coding (P) or bidirectionally-predictive coding (B) and each respectively representing one of an I, P and B coded video picture, with successive I coded signals being separated by plural B coded signals having at least one P coded signal interspersed between the B coded signals, and with B coded signals being encoded from P coded signals and selectively from I coded signals, and with P coded signals being selectively encoded from preceding I coded and P coded signals, said method comprising the steps of:

responding to said encoded video signals to produce error-corrected encoded video signals;

decoding said error-corrected encoded video signals and using a decoded video signal as a reference for decoding error-corrected encoded video signals representing subsequent P and B coded video pictures;

detecting errors in said encoded video signals, determining if the detected errors are non-correctable and inhibiting the decoding of an encoded video signal having a non-correctable error; and substituting for display one of the decoded error-corrected video signals for an encoded video signal having at least one detected error determined to be non-correctable, such that if a B coded signal is detected as having a non-correctable error, said B coded signal is replaced by a decoded error-corrected P coded signal for display, and if a P coded signal is detected as having a non-correctable error, said P coded signal and those P coded and B coded signals encoded therefrom are selectively replaced by a preceding decoded error-corrected P coded signal or by a preceding decoded error-corrected I coded signal for display, and if an I coded signal is detected as having a non-correctable error, said I coded signal and those P coded and B coded signals encoded therefrom, are replaced by a decoded error-corrected P coded signal for display.

8. A method for decoding as in claim 7 wherein the step of decoding decodes a respective error-corrected encoded video signal representing a respective video picture by utilizing as said reference an adjacent encoded video signal representing a video picture adjacent to said respective video picture and wherein the substituting step substitutes one of said decoded error-corrected video signals for an adjacent non-correctable encoded video signal.

9. A method for decoding as in claim 7 wherein the substituting step substitutes a previously decoded error-corrected video signal representing one of a previous I and P coded video picture for said non-correctable encoded video signal.

10. A method for decoding as in claim 8 wherein the substituting step substitutes a previously decoded error-corrected video signal representing one of a previous I and P coded video picture for an encoded video signal representing a B coded video picture located in said sequence of coded video pictures between the previous I or P coded video picture and a future I coded video picture when said non-correctable encoded video signal represents a P coded video picture located between said previous I or P coded video picture and said future I coded video picture.

11. A method for decoding as in claim 8 wherein the substituting step substitutes a previously decoded error-corrected video signal representing one of a previous I and P coded video picture for: (i) an encoded video signal representing a B coded video picture located in said sequence of coded video pictures between the previous I or P coded video picture and a current P coded video picture, and (ii) an encoded video signal representing one of a P and B coded video picture located in said sequence of coded video pictures between said current P coded video picture and a future I coded video picture when said non-correctable encoded video signal represents a current P coded video picture.

12. A method for decoding as in claim 8 wherein the substituting step substitutes a previously decoded error-corrected video signal representing one of a previous I and P coded video picture for: (i) an encoded video signal representing a B coded video picture located in said sequence of coded video pictures between said previous I or P coded video picture and a current I coded video picture, and (ii) an encoded video signal representing one of a P and B coded video picture located in said sequence of coded video pictures between said current I coded video picture and a future I coded video picture when said non-correctable encoded video signal represents a current I coded video picture.

13. An apparatus for decoding a sequence of encoded video signals recorded on a recording medium, each of said video signals included in the sequence being encoded by intra-coding (I), predictive-coding (P) or bidirectionally-predictive coding (B) and each respectively representing one of a plurality of I, P and B coded video pictures, with successive I coded signals being separated by plural B coded signals having at least one P coded signal interspersed between the B coded signals, and with B coded signals being encoded from P coded signals and selectively from I coded signals, and with P coded signals being selectively encoded from preceding I coded and P coded signals, said apparatus comprising:

means for reproducing said encoded video signals from said recording medium, each reproduced encoded video signal representing one of said I, P and B coded video pictures and arranged in a coding sequence representing a corresponding sequence of coded video pictures;

means responsive to the reproduced encoded video signals to produce error-corrected reproduced encoded video signals;

decoding means for decoding said error-corrected reproduced encoded video signals and for using a decoded video signal as a reference for decoding error-corrected encoded video signals representing subsequent P and B coded video pictures;

means for detecting errors in said reproduced encoded video signals, for determining if the detected errors are non-correctable and for inhibiting the decoding of an encoded video signal having a non-correctable error; and substituting means for substituting for display one of the decoded error-corrected reproduced video signals for a reproduced encoded video signal having at least one detected error determined to be non-correctable, such that if a B coded signal is detected as having a non-correctable error, said B coded signal is replaced by a decoded error-corrected P coded signal for display, and if a P coded signal is detected as having a non-correctable error, said P coded signal and those P coded and B coded signals encoded therefrom are selectively replaced by a preceding decoded error-corrected P coded signal or by a preceding decoded error-corrected I coded signal for display, and if an I coded signal is detected as having a non-correctable error, said I coded signal and those P coded and B coded signals encoded therefrom, are replaced by a decoded error-corrected P coded signal for display.

14. An apparatus for decoding as in claim 13 wherein the decoding means is operable to decode a respective error-corrected reproduced encoded video signal representing a respective video picture by utilizing as said reference an adjacent reproduced encoded video signal representing a video picture adjacent to said respective video picture and wherein said substituting means is operable to substitute one of said decoded error-corrected reproduced video signals for an adjacent non-correctable reproduced encoded video signal.

15. An apparatus for decoding as in claim 13 wherein said substituting means is operable to substitute a previously decoded error-corrected reproduced video signal representing one of a previous I and P coded video picture for said non-correctable reproduced encoded video signal.

16. An apparatus for decoding as in claim 13, further comprising demodulation means for demodulating said reproduced encoded video signals.

17. An apparatus for decoding as in claim 14 wherein said substituting means is operable to substitute a previously decoded error-corrected reproduced video signal representing one of a previous I and P coded video picture for a reproduced encoded video signal representing a B coded video picture located in said sequence of coded video pictures between the previous I or P coded video picture and a future I coded video picture when said non-correctable reproduced encoded video signal represents a P coded video picture located between said previous I or P coded video picture and said future I coded video picture.

18. An apparatus for decoding as in claim 14 wherein said substituting means is operable to substitute a previously decoded error-corrected reproduced video signal representing one of a previous I and P coded video picture for: (i) a reproduced encoded video signal representing a B coded video picture located in said sequence of coded video pictures between the previous I or P coded video picture and a current P coded video picture, and (ii) a reproduced encoded video signal representing one of a P and B coded video picture located in said sequence of coded video pictures between said current P coded video picture and a future I coded video picture when said non-correctable reproduced encoded video signal represents a current P coded video picture.

19. An apparatus for decoding as in claim 14 wherein said substituting means is operable to substitute a previously decoded error-corrected reproduced video signal representing one of a previous I and P coded video picture for: (i) a reproduced encoded video signal representing a B coded video picture located in said sequence of coded video pictures between said previous I or P coded video picture and a current I coded video picture, and (ii) a reproduced encoded video signal representing one of a P and B coded video picture located in said sequence of coded video pictures between said current I coded video picture and a future I coded video picture when said non-correctable reproduced encoded video signal represents a current I coded video picture.

20. A method for decoding a sequence of encoded video signals recorded on a recording medium, each of said encoded video signals included in the sequence being encoded by intra-coding (I), predictive-coding (P) or bidirectionally-predictive coding (B) and each respectively representing one of a plurality of I, P and B coded video pictures, with successive I coded signals being separated by plural B coded signals having at least one P coded signal interspersed between the B coded signals, and with B coded signals being encoded from P coded signals and selectively from I coded signals, and with P coded signals being selectively encoded from preceding I coded and P coded signals, said method comprising the steps of:

reproducing said encoded video signals from said recording medium so as to produce a plurality of reproduced encoded video signals each representing one of said I, P and B coded video pictures and arranged in a coding sequence representing a corresponding sequence of coded video pictures;

responding to said reproduced encoded video signals to produce error-corrected reproduced encoded video signals;

decoding said error-corrected reproduced encoded video signals and using a decoded video signal as a reference for decoding error-corrected encoded video signals representing subsequent P and B coded video pictures;

detecting errors in said reproduced encoded video signals, determining if the detected errors are non-correctable and inhibiting the decoding of an encoded video signal having a non-correctable error; and substituting for display one of the decoded error-corrected reproduced video signals for a reproduced encoded video signal having at least one detected error determined to be non-correctable, such that if a B coded signal is detected as having a non-correctable error, said B coded signal is replaced by a decoded error-corrected P coded signal for display, and if a P coded signal is detected as having a non-correctable error, said P coded signal and those P coded and B coded signals encoded therefrom are selectively replaced by a preceding decoded error-corrected P coded signal or by a preceding decoded error-corrected I coded signal for display, and if an I coded signal is detected as having a non-correctable error, said I coded signal and those P coded and B coded signals encoded therefrom, are replaced by a decoded error-corrected P coded signal for display.

21. A method for decoding as in claim 20 wherein the step of decoding decodes a respective error-corrected reproduced encoded video signal representing a respective video picture by utilizing as said reference an adjacent reproduced encoded video signal representing a video picture adjacent to said respective video picture and wherein the substituting step substitutes one of said decoded error-corrected reproduced video signals for an adjacent non-correctable reproduced encoded video signal.

22. A method for decoding as in claim 20 wherein the substituting step substitutes a previously decoded error-corrected reproduced video signal representing one of a previous I and P coded video picture for said non-correctable reproduced encoded video signal.

23. A method for decoding as in claim 20, further comprising the step of demodulating said reproduced encoded video signals.

24. A method for decoding as in claim 21 wherein the substituting step substitutes a previously decoded error-corrected reproduced video signal representing one of a previous I and P coded video picture for a reproduced encoded video signal representing a B coded video picture located in said sequence of coded video pictures between the previous I or P coded video picture and a future I coded video picture when said non-correctable reproduced encoded video signal represents a P coded video picture located between said previous I or P coded video picture and said future I coded video picture.

25. A method for decoding as in claim 21 wherein the substituting step substitutes a previously decoded error-corrected reproduced video signal representing one of a previous I and P coded video picture for: (i) a reproduced encoded video signal representing a B coded video picture located in said sequence of coded video pictures between the previous I or P coded video picture and a current P coded video picture, and a reproduced encoded video signal representing one of a P and B coded video picture located in said sequence of coded video pictures between said current P coded video picture and a future I coded video picture when said non-correctable encoded video signal represents a current P coded video picture.

26. A method for decoding as in claim 21 wherein the substituting step substitutes a previously decoded error-corrected reproduced video signal representing one of a previous I and P coded video picture for: (i) a reproduced encoded video signal representing a B coded video picture located in said sequence of coded video pictures between said previous I or P coded video picture and a current I coded video picture, and (ii) a reproduced encoded video signal representing one of a P and B coded video picture located in said sequence of coded video pictures between said current I coded video picture and a future I coded video picture when said non-correctable reproduced encoded video signal represents a current I coded video picture.

* * * * *